Figure 1:
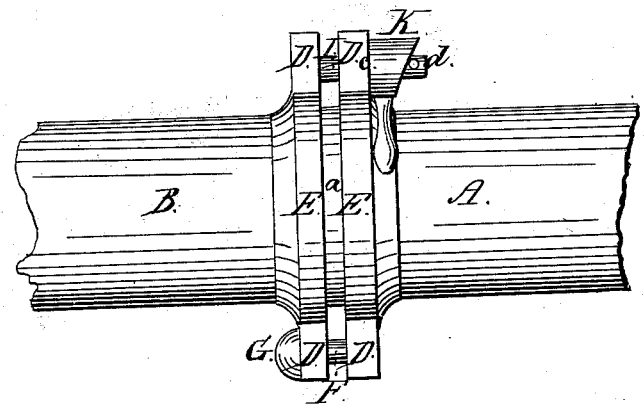

Hanson & Bush,
Hose Coupling,
Nº 80,407.          Patented July 28, 1868.

Witnesses:
H. Ballou.
W. T. Emerson.

Inventors;
L. M. Hanson,
Samuel Bush,
per Gardner & Hyde attys.

United States Patent Office.

L. W. HANSON AND SAMUEL BUSH, OF SPRINGFIELD, MASSACHUSETTS.

*Letters Patent No. 80,407, dated July 28, 1868.*

IMPROVEMENT IN HOSE-COUPLING.

*The Schedule referred to in these Letters Patent and making part of the same.*

TO ALL WHOM IT MAY CONCERN:

Be it known that we, L. W. HANSON and SAMUEL BUSH, of Springfield, Hampden county, Commmonwealth of Massachusetts, have invented a new and useful Improved Hose-Coupling; and we do hereby declare that the following is a full and clear description thereof, reference being had to the accompanying drawings, and to the letters of reference marked thereon.

In the drawings—

Figure 2:
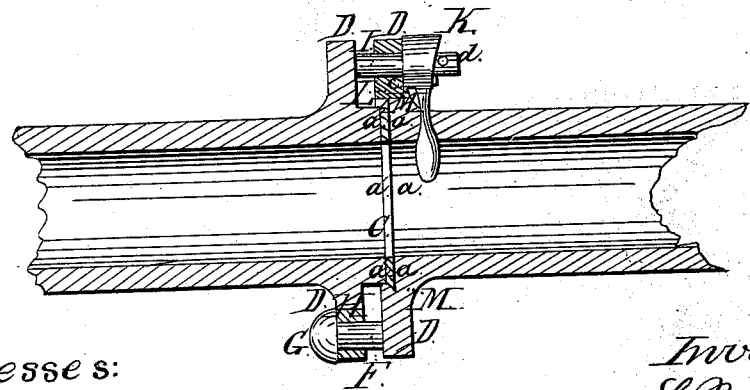

Figure 1 is a side view of our invention,

Figure 2 a sectional view, and

Figure 3

This invention consists of a new and convenient arrangement for coupling the lengths of a hose together, so that they may be easily detached and as easily coupled again.

In construction we form our coupling of two parts, A and B, which have faces $a$ and $a'$, which fit together, and thereby continue the pipe. The face $a'$ upon the part B enters the part A in a slight degree, and rests upon a rim of packing C, hereafter described.

Each of the parts A and B has projections D D, &c., corresponding to each other, and arranged upon opposite sides of the rims E and E. It is by means of these projections that the coupling is locked together. At one side of the coupling the parts are held when locked by means of a pin, F, attached to the projection upon the part A, the pin having a head, G, and slipping in a notch, H, in the corresponding projection in the part B, so that the head G prevents it from being drawn through by resting upon the edges of the projection on each side of the notch H.

On the other side of the coupling the projections are locked together by means of a cam-lever operating upon the pin I of the part B, so as to cam upon the pin $b$ of the pin I, and press the flat face of the cam-head K against the projection of the part A at $c$, the pin I entering a groove or notch, L, similar to the one, H, in the projection on the other side of the part B.

The packing consists of a rubber ring, C, inserted in the face of the part A, and covering it where the projecting part $a'$ rests against it. This packing is held in place by means of a groove, M, in the face $a$ of the part A, the washer being sprung into this groove around its outer circumference, and so held by its own elasticity.

The operation of this device is as follows:

The two parts are slid together, the pin F entering the groove H, and the pin I, the groove L, on the opposite part and side. The lever N is then turned, and its cam-head K locks the parts togetether, a fulcrum being obtained by the central parts so that they can be pressed very closely together.

The advantages of our device are in its simplicity and easy operation, requiring no wrench or lock separate from the coupling itself, and only a half turn of the cam-lever to lock it.

Now, having described our invention, what we claim as new, and desire to secure by Letters Patent, is—

1. The combination and arrangement of the two parts A and B, having pin F and notch H on one side, and cam-lock K and notch L on the other, substantially as shown and described.

2. In combination with the above, the rubber packing C, arranged in and held by the groove M, substantially as shown.

L. W. HANSON,
SAMUEL BUSH.

Witnesses:
EDWARD H. HYDE,
J. B. GARDINER.